US006775786B2

United States Patent
Toll et al.

(10) Patent No.: US 6,775,786 B2
(45) Date of Patent: *Aug. 10, 2004

(54) METHOD AND APPARATUS FOR POWER MODE TRANSITION IN A MULTI-THREAD PROCESSOR

(75) Inventors: Bret L. Toll, Tigard, OR (US); Alan B. Kyker, Portland, OR (US); Stephen H. Gunther, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 362 days.

This patent is subject to a terminal disclaimer.

(21) Appl. No.: 09/951,908

(22) Filed: Sep. 12, 2001

(65) Prior Publication Data

US 2003/0051174 A1 Mar. 13, 2003

(51) Int. Cl.$^7$ .................................................. G06F 1/26
(52) U.S. Cl. ...................................................... 713/323
(58) Field of Search ................................ 713/300–340; 712/10, 11, 20; 710/5

(56) References Cited

U.S. PATENT DOCUMENTS

| | | | | |
|---|---|---|---|---|
| 5,367,697 A | * | 11/1994 | Barlow et al. | 713/330 |
| 5,515,538 A | * | 5/1996 | Kleiman | 710/260 |
| 5,634,131 A | * | 5/1997 | Matter et al. | 713/322 |
| 5,655,124 A | * | 8/1997 | Lin | 713/322 |
| 5,737,615 A | * | 4/1998 | Tetrick | 713/324 |
| 5,813,022 A | * | 9/1998 | Ramsey et al. | 711/3 |
| 5,832,243 A | * | 11/1998 | Seeman | 710/310 |
| 6,308,279 B1 | * | 10/2001 | Toll et al. | 713/323 |

* cited by examiner

Primary Examiner—Paul R. Myers
(74) Attorney, Agent, or Firm—Kenyon & Kenyon

(57) ABSTRACT

A method and apparatus for power mode transition in a multi-thread processor. A first indication is issued, including a first identifier associated with a first logical processor in a processor, that the first logical processor has entered a power mode. A second indication is issued, including a second identifier associated with a second logical processor in the processor, that the second logical processor has entered the power mode. The indications may be, for example, stop grant acknowledge special bus cycles indicating that the logical processors have entered a stop grant mode. The processor may be transitioned to a sleep mode when both the first and second indications have been issued.

46 Claims, 5 Drawing Sheets

METHOD AND APPARATUS FOR POWER MODE TRANSITION IN A MULTI-THREAD PROCESSOR

FIELD

The invention relates to processor power modes. More particularly, the invention relates to a method and apparatus for power mode transition in a multi-thread processor.

BACKGROUND

A processor consumes power as it performs various functions, such as mathematical operations. The amount of power used by the processor will impact, for example, how long a battery in a mobile computer will last. Designers, therefore, have attempted to limit the power used by a processor.

Even when not performing mathematical operations, the generation and distribution of internal clock signals that synchronize the processor's operation will consume a considerable amount of power. To save power, a processor may be designed to operate in a reduced power state when inactive. In the reduced power state, all but a few internal clocks are turned off, which saves power and may extend the life of a battery.

For example, a "sleep" power mode allows most of the internal clocks on a chip to be turned off when the system is idle. A processor may be in the sleep mode, for example, when the system is waiting for an external event, such as the opening of a lid on a laptop computer, or when the computer operating system (OS) is waiting for an Input/Output (I/O) operation.

To aid in energy efficient computing, in some implementations the processor is placed into an even lower power state referred to as a "deep sleep" power mode. The deep sleep mode may be entered, for example, by stopping a clock input signal to the processor after the processor has entered the sleep power mode. This allows the processor to maintain the operational state of elements in the chip, but only draws power equivalent to the processor's leakage current.

With highly complex processors, such as out-of-order processors, some internal "clean-up" may be desired before the internal clocks are disabled. Such clean up is typically performed by micro-code which, for example, cleans up the operational state, drains queues, puts the processor to sleep and waits for an event, or "alarm," that marks the end of the hibernation.

A "stop grant" power mode, which itself is a low power mode, is typically used for this clean up process. Typically, such a processor transitions from an active mode to the stop grant mode, based on, for example, a pin on the chip being asserted by a "chipset" that controls the processor. When the desired operations have been performed by the micro-code in the processor, the processor sends the chipset an indication, such as a stop grant acknowledge Special Bus Cycle (SBC) over a bus. The chipset may then transition the processor into the sleep and deep sleep modes by, for example, asserting another pin or stopping the bus clock.

SUMMARY

In accordance with an embodiment of the present invention, a first indication is issued, including a first identifier associated with a first logical processor in a processor, that the first logical processor has entered a power mode. A second indication is also issued, including a second identifier associated with a second logical processor in the processor, that the second logical processor has entered the power mode.

DETAILED DESCRIPTION

An arrangement such as the ones described in the background section, however, may pose problems when used in a shared resources multi-processing environment, which allows a single processor to perform several mathematical operations substantially simultaneously. For example, a multi-thread (MT) processor contains several independent "logical processors," or "threads," and it is possible for a one logical processor to enter a power mode, such as the stop grant mode, while the other logical processor remains in the active mode. This may be thought of as a thread sleep, in which a single thread is put to sleep. All clock signals in the MT processor should not be turned off if even one thread is still in the active mode because the operations performed by that thread may still need synchronization. When every logical processor in a MT processor enter thread sleep state, the clocks on the MT processor may be turned off.

It is possible that such a MT processor may be designed to send a stop grant acknowledge SBC as soon as one thread enters the stop grant mode. This, however, may cause a problem because the chipset might try to force the MT processor into the sleep mode, even though one of the threads is not ready. The chipset, of course, could be designed to wait a predetermined amount of time before the MT processor enters sleep mode, but this would slow the process down, and there is still no guarantee that the other thread will be ready Another approach would be to have the processor issue a stop grant acknowledge SBC only when all of the threads in the processor have completed the clean up process. This, however, is difficult because the micro-code would have to be "thread aware." That is, the micro-code would have to execute different commands, such as commands to issue a stop grant acknowledge SBC, depending on the thread on which it is executing.

Moreover, some computer systems will have a number of MT processors. The power mode transitions in such a case will have to account for, and keep track of, multiple threads running on multiple processors.

In view of the foregoing, it can be appreciated that a need exists for a method and apparatus to address the problems discussed above.

Figure 1:
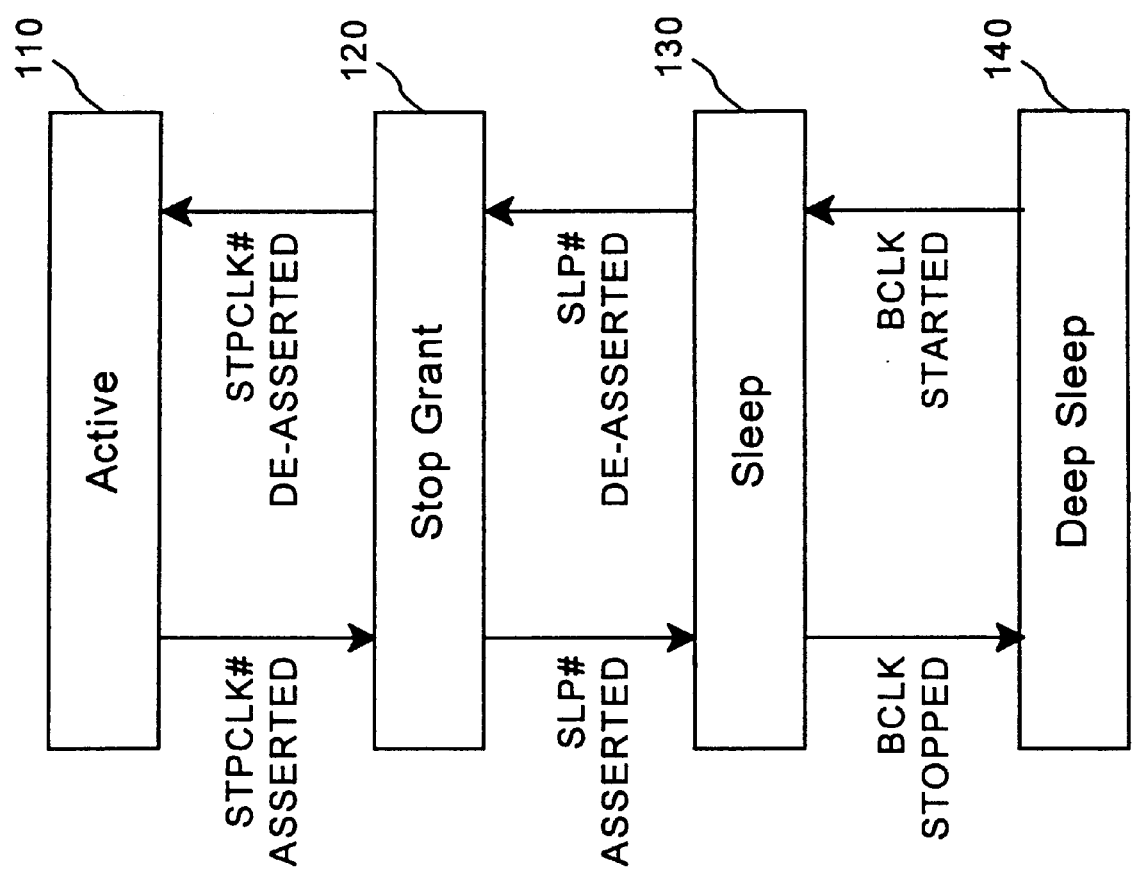
FIG. 1 is a block diagram of MT processor power mode states according to an embodiment of the present invention.

An embodiment of the present invention is directed to a method and apparatus for power mode transition in a MT processor. Referring now in detail to the drawings wherein like parts are designated by like reference numerals throughout, FIG. 1 shows a block diagram of MT processor power mode states according to an embodiment of the present invention. When the MT processor is in the active power mode 110 the processor's internal clocks are running causing a relatively large amount of power to be consumed. When the MT processor is to be transitioned to an energy efficient mode, a chipset controlling the processor may assert a signal on a stop clock pin (STPCLK#).

When the MT processor samples the signal on the stop clock pin as "asserted," stop clock micro-code running in the MT processor will clean up the appropriate operational states and set up the correct "break events," or events that will cause the MT processor to wake up. Eventually, as a thread goes to sleep the micro-code associated with that thread stops running. When the threads in the MT processor are asleep, the hardware turns some of the internal clocks off to reduce the amount of power being used. It should be noted that the core clocks may actually be left running, as in a debug mode, or the clock may be turned on to process a "snoop," in which case the processor will respond normally to the inquiry. When the processor senses a break event, it turns the internal clocks back on and returns to the active power 110 mode.

According to this particular embodiment of the present invention, when the stop clock micro-code executes for one logical processor in the MT processor, a stop grant acknowledge SBC is issued, including an identifier associated with that particular logical processor. When the micro-code for all of the logical processors have executed, the MT processor may enter the stop grant mode. The chipset may then assert the signal on the sleep pin (SLP#), which places the processor in a sleep mode 130. After waiting an appropriate amount of time, the chipset may turn off the clocks by stopping a clock input signal to the processor (BCLK). This places the processor in a deep sleep power mode 140. As is also shown in FIG. 1, the processor may be returned to the active power mode 110 by, for example, starting the BCLK, de-asserting the SLP# and de-asserting the STPCLK#.

Figure 2:
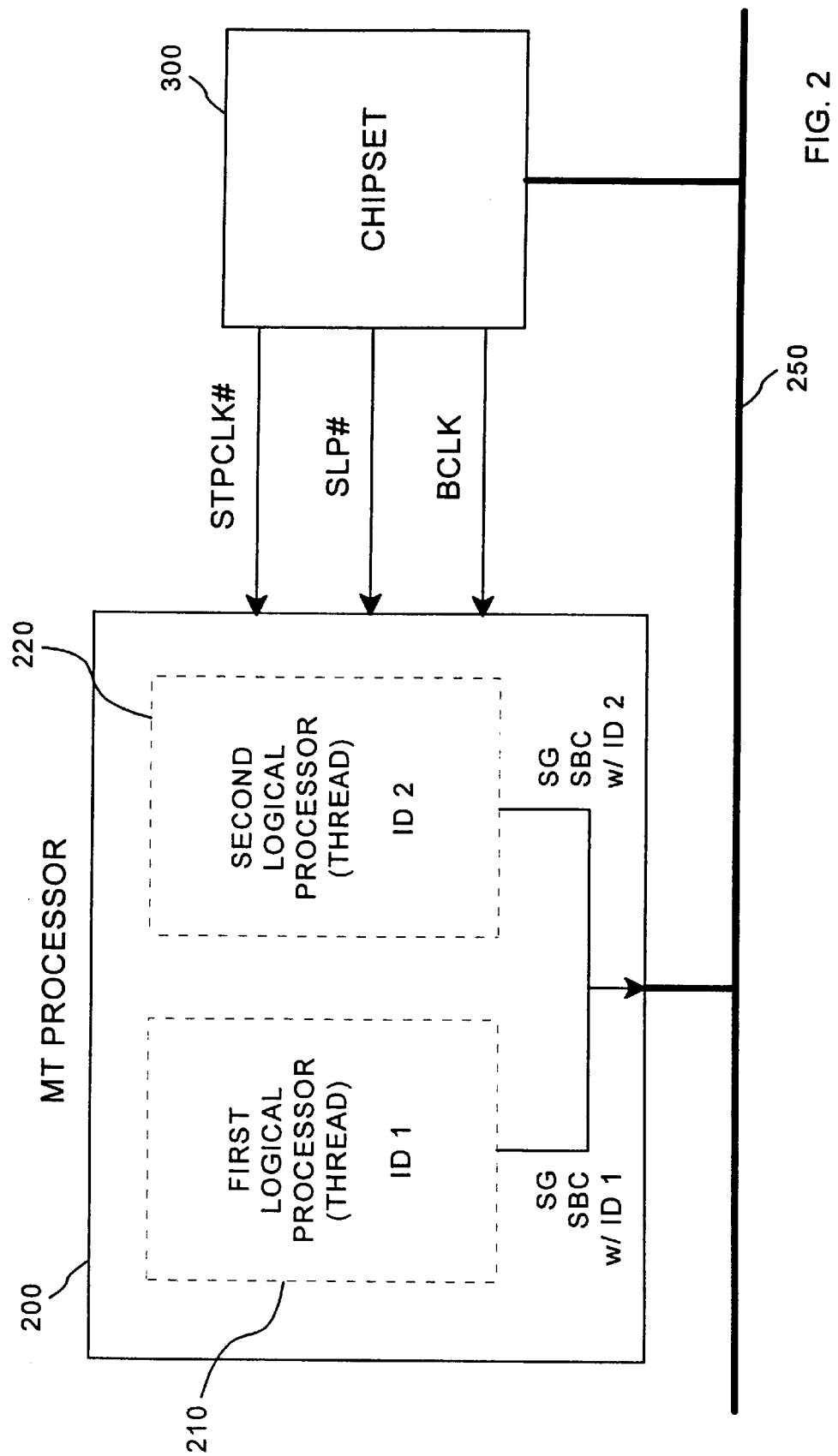
FIG. 2 is a block diagram of a computer system according to an embodiment of the present invention.

FIG. 2 is a block diagram of a computer system according to an embodiment of the present invention. The computer system includes a MT processor 200 and a chipset 300 which communicate over a bus 250. The MT processor 200 contains a first logical processor, or "thread," 210 with an associated processor identifier signal 1. The MT processor 200 also contains a second logical processor 220 with an associated processor identifier signal 2. Although the MT processor 200 shown in FIG. 2 has two logical processors 210, 220, an alternative embodiment of the present invention may be used with processors having any number of threads. Similarly, any numbering or labeling system could be used for the processor identifier signals or numbers. In addition to communicating over the bus 250, the chipset 300 may assert a signal on the stop clock pin, a sleep pin, and may start and stop the bus clock to control the MT processor 200.

When one of the logical processors 210, 220 enters a thread sleep state, the associated architectural state is saved and some of the resources may be used by the other thread. As a logical processor 210, 220 completes the STPCLK# micro-code flow, it issues a stop grant acknowledge SBC over the bus 250, including the identifier signal of the associated thread. Thus, the MT processor 200 produces two SBCs before the clocks are turned off.

Figure 3:
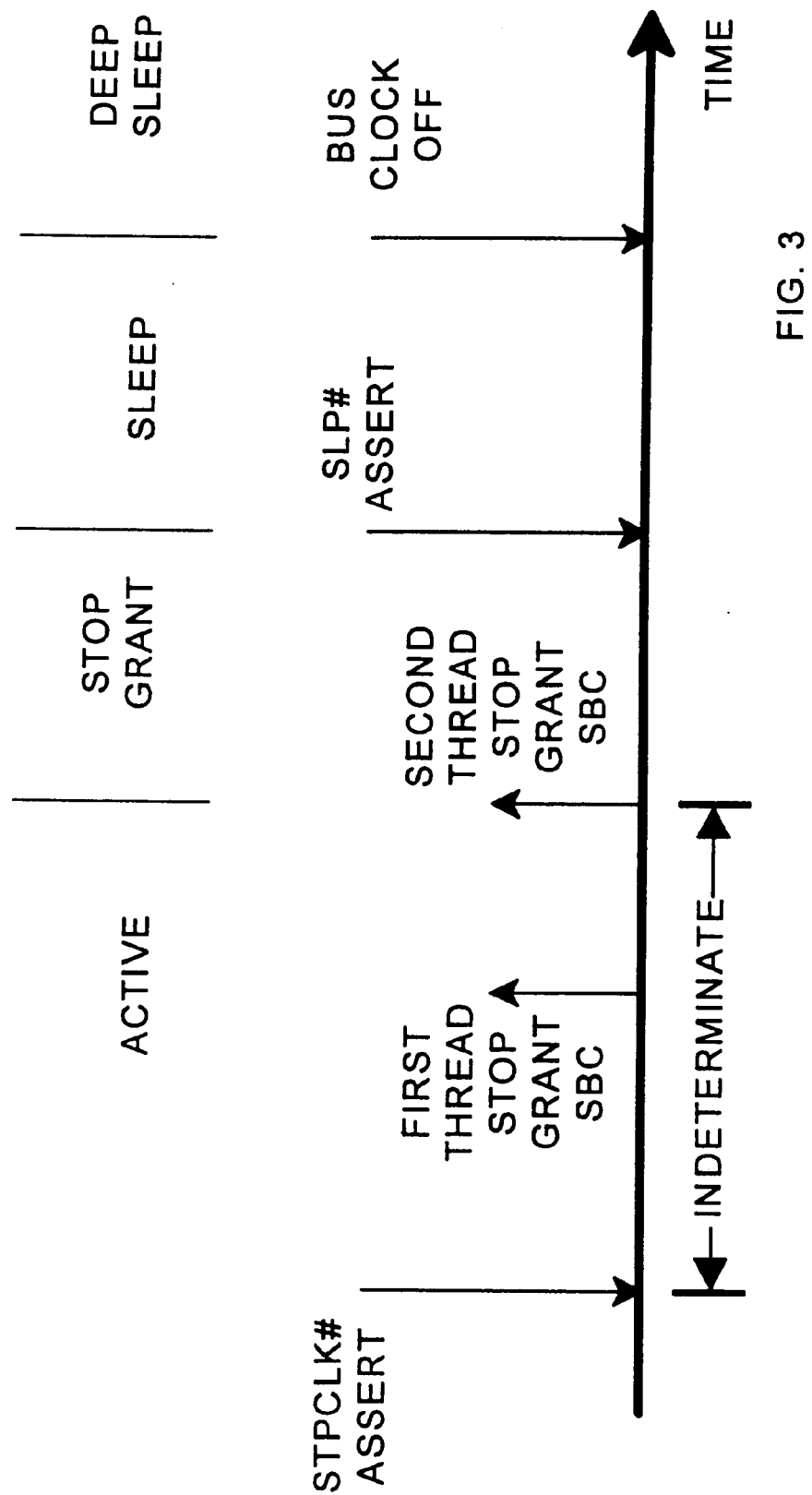
FIG. 3 is a timing diagram of MT processor power modes, and associated signals, according to an embodiment of the present invention.

Refer now to FIG. 3, which is a timing diagram of MT processor power modes, and associated signals, according to an embodiment of the present invention. As described above, after the signal on the stop clock pin is asserted by the chipset 300, each thread 210, 220 in the MT processor 200 will issue a separate stop grant acknowledge SBC, including the logical processor ID signal associated with that thread. These are shown in FIG. 3 as the first and second thread stop grant acknowledge SBCs. After all of the threads have issued a stop grant acknowledge SBC, the MT processor 200 may transition from the active state to the stop grant state. Between the time the stop clock pin is asserted and the last logical processor issues a stop grant acknowledge SBC, the state of the MT processor 200 should be considered indeterminate. The chipset 300 should therefore wait for a stop grant acknowledge SBC from the threads before asserting the sleep pin. As described above with respect to FIG. 1, after waiting an appropriate amount of time the chipset 300 may transition the MT processor 200 to the deep sleep mode by turning off the bus clock input signal to the MT processor 200.

Figure 4:
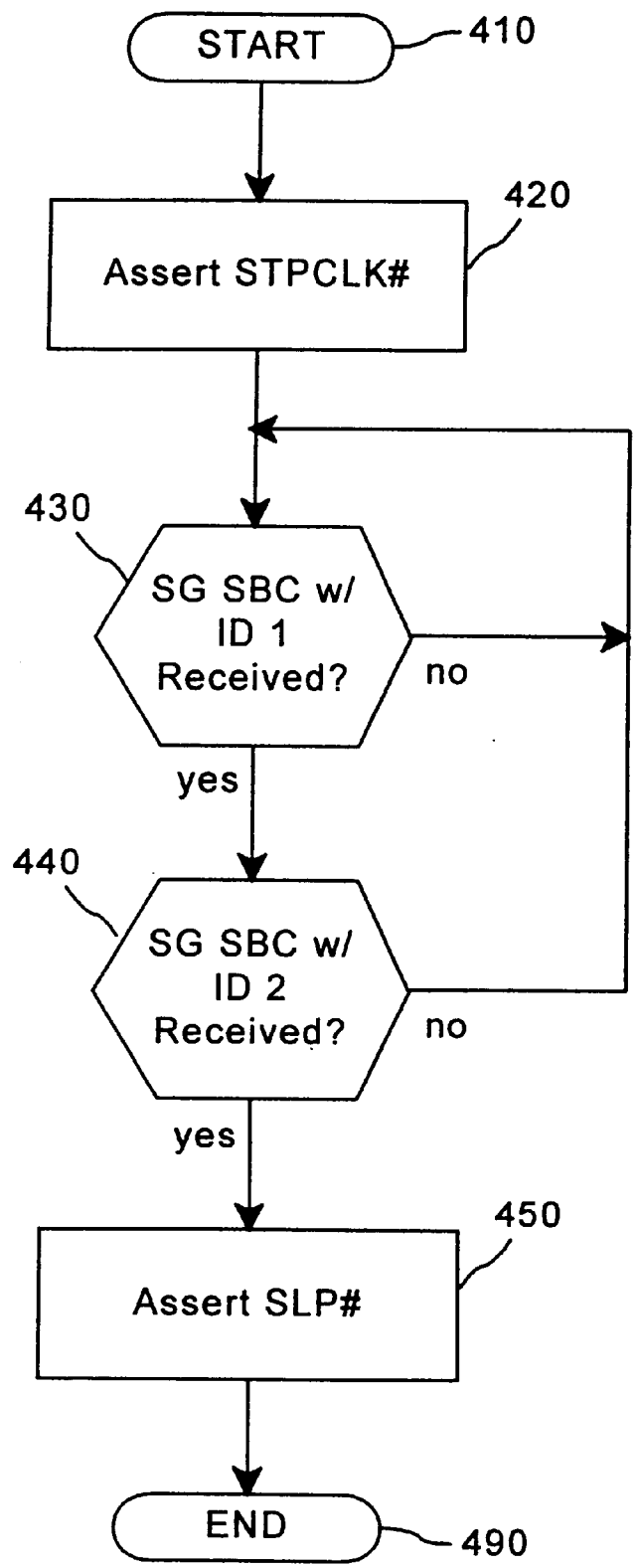
FIG. 4 is a block flow diagram of a method to transition MT processor power modes according to an embodiment of the present invention.

FIG. 4 is a block flow diagram of a method to transition MT processor power modes according to an embodiment of the present invention. After beginning in the active mode at 410, the chipset 300 asserts the signal on the stop clock pin at 420. The chipset 300 then waits until stop grant acknowledge SBCs have been received from both threads at 430 and 440. the chipset 300 may use the identifier associated with the stop grant acknowledge SBCs to decide which threads have completed the stop grant micro-code. Only when both stop grant acknowledge SBCs have been received will the chipset 300 assert the sleep pin at 450, causing the MT processor 200 to enter the sleep mode, before completing at 490. Although not shown in FIG. 4, the chipset 300 may then transition the MT processor 200 to the deep sleep mode by waiting an appropriate amount of time and turning off the bus clock input to the MT processor 200.

Using such a method, confusion about the power mode state of the MT processor 200 may be avoided. Suppose, for example, that the chipset 300 asserts the signal on the stop clock pin. One thread may immediately act on the stop clock signal by executing the stop clock micro-code. The other thread, however, may be involved with a higher priority interrupt, such as page fault handling. In this case, the chipset 300 will be aware that the MT processor 200 has not entered the stop grant state because only one stop grant acknowledge SBC will have issued.

Figure 5:
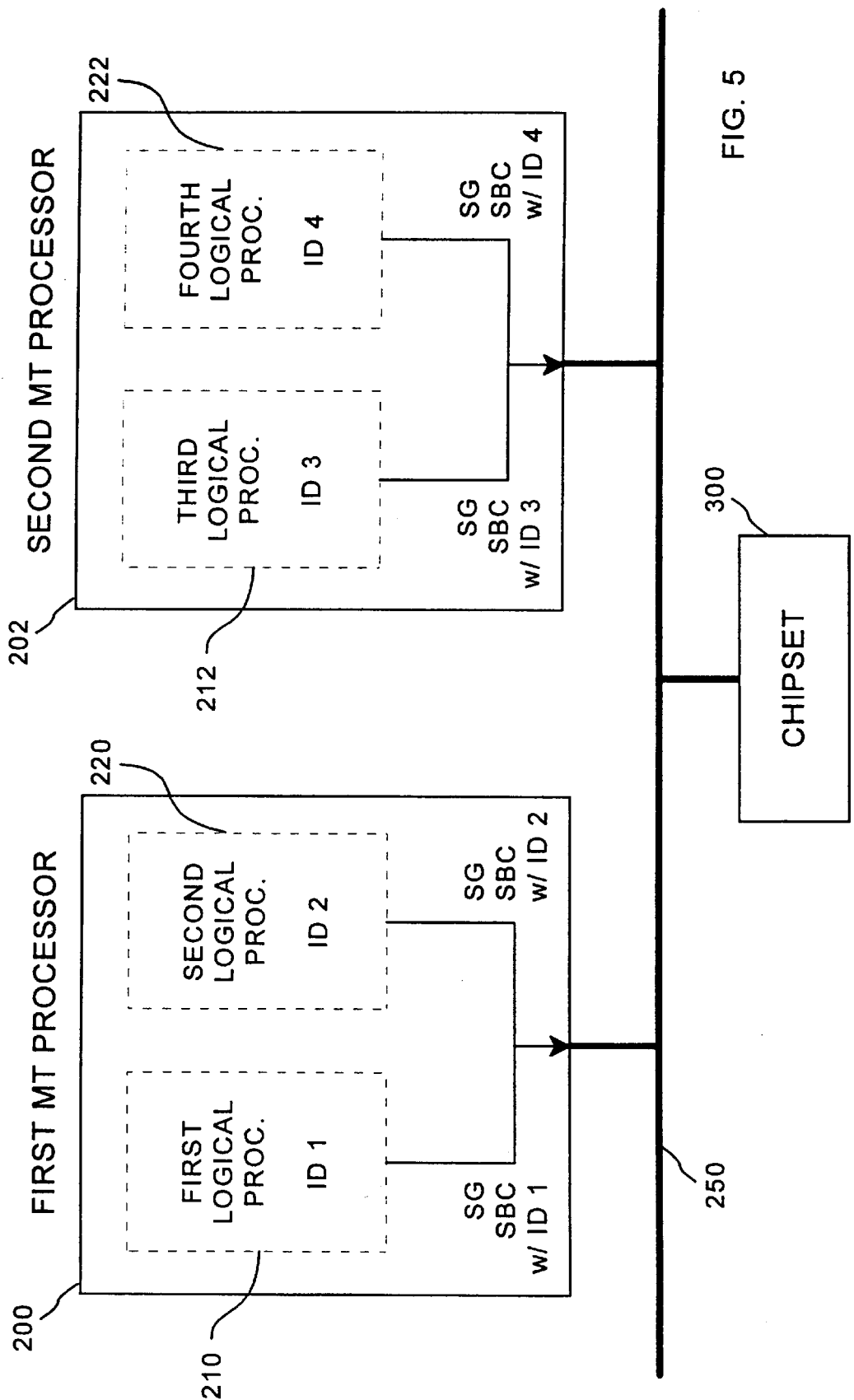
FIG. 5 is a block diagram of a computer system having two MT processors according to an embodiment of the present invention.

This embodiment of the present invention will also avoid confusion when there are several MT processors working together. For example, consider FIG. 5 which is a block diagram of a computer system having two MT processors 200, 202 according to an embodiment of the present invention. The first MT processor 200 has two threads 210, 220 and the second MT processor 202 has two threads 212, 222. The chipset 300 may determine which thread in which MT processor have performed the stop clock micro-code by evaluating the identifier included in a stop grant SBC on the bus 250.

Because the MT processor 200 sends out a stop grant acknowledge SBC for the first thread 210, 220 that reaches that code, even if other threads have not performed the associated logic, the micro-code may be created without being "thread aware." That is, the micro-code is simplified because it may execute the similar commands regardless of the thread 210, 220 on which it is executing.

Although various embodiments are specifically illustrated and described herein, it will be appreciated that modifications and variations of this embodiment of the present invention are covered by the above teachings and within the purview of the appended claims without departing from the spirit and intended scope of the invention. For example, although a MT processor with two logical processors was used to illustrate an embodiment of the present invention, it will be appreciated that MT processors having another number of logical processors could also fall within the scope of the invention. Moreover, although software or hardware are described to control certain functions, such functions may be performed using either software, hardware or a combination of software and hardware, as is well known in the art.

What is claimed is:

1. A system, comprising:
   a first logical processor to notify a power control unit that the first logical processor has entered a first power mode;
   a second logical processor to notify the power control unit that the second logical processor has entered the first power mode; and
   a clock to be utilized by said first and second logical processors;
   wherein said power control unit is to cause said first and second logical processors to enter a second power mode responsive to notifications by the first and second logical processors.

2. The system of claim 1, wherein the power control unit includes a chipset unit and a processor controller unit.

3. The system of claim 2, wherein the processor controller unit is to instruct the first and second logical processors to enter said second power mode responsive to receipt of said notifications by the chipset unit.

4. The system of claim 1, wherein the first power mode represents an activity level of a logical processor.

5. The system of claim 1, wherein the first power mode is a first low power mode, and wherein the second power mode is a second low power mode.

6. The system of claim 1, wherein the first power mode is a stop grant mode, and wherein the second power mode is a sleep mode.

7. The system of claim 1, wherein the first logical processor represents a first process thread, and wherein the second logical processor represents a second process thread.

8. The system of claim 7, wherein the first power mode is a first thread sleep mode.

9. The system of claim 8, wherein the first logical processor is to notify the power control unit that the first logical processor has entered the first power mode by issuing a first indication, including a first identifier associated with the first logical processor, to said power control unit; and wherein the second logical processor is to notify the power control unit that the second logical processor has entered the first power mode by issuing a second indication, including a second identifier associated with the second logical processor, to said power control unit.

10. The system of claim 9, wherein the first identifier includes a first processor identification signal associated with the first logical processor, and wherein the second identifier includes a second processor identification signal associated with the second logical processor.

11. The system of claim 9, wherein issuing the first indication includes issuing the first indication as a first special bus cycle, and wherein issuing the second indication includes issuing the second indication as a second special bus cycle.

12. The system of claim 11, wherein the first special bus cycle is a first stop grant special bus cycle, and wherein the second special bus cycle is a second stop grant special bus cycle.

13. A method, comprising:
   notifying a power control unit that a first logical processor has entered a first power mode;
   notifying the power control unit that a second logical processor has entered the first power mode;
   utilizing a clock by said first and second logical processors; and
   causing a processor that includes the first and second logical processors to enter a second power mode responsive to the notifications.

14. The method of claim 13, wherein the power control unit includes a chipset unit and a processor controller unit.

15. The method of claim 14, further comprising: instructing the first and second logical processors by the processor controller unit to enter said second power mode responsive to receipt of said notifications by the chipset unit.

16. The method of claim 13, wherein the first power mode represents an activity level of a logical processor.

17. The method of claim 13, wherein the first power mode is a first low power mode, and wherein the second power mode is a second low power mode.

18. The method of claim 13, wherein the first power mode is a stop grant mode, and wherein the second power mode is a sleep mode.

19. The method of claim 13, wherein the first logical processor represents a first process thread, and wherein the second logical processor represents a second process thread.

20. The method of claim 19, wherein the first power mode is a first thread sleep mode.

21. The method of claim 20, wherein said notifying the power control unit that the first logical processor has entered the first power mode includes issuing a first indication, including a first identifier associated with the first logical processor, to said power control unit; and wherein said notifying the power control unit that the second logical processor has entered the first power mode includes issuing a second indication, including a second identifier associated with the second logical processor, to said power control unit.

22. The method of claim 21, wherein the first identifier includes a first processor identification signal associated with the first logical processor, and wherein the second identifier includes a second processor identification signal associated with the second logical processor.

23. The method of claim 21, wherein issuing the first indication includes issuing the first indication as a first special bus cycle, and wherein issuing the second indication includes issuing the second indication as a second special bus cycle.

24. The method of claim 23, wherein the first special bus cycle is a first stop grant special bus cycle, and wherein the second special bus cycle is a second stop grant special bus cycle.

25. An apparatus comprising:
   a plurality of thread execution resources to process instructions for a plurality of instruction threads, responsive to a common clock signal; and
   a power unit to place a processor, which includes said thread execution resources, in a low power mode responsive to an activity level indication associated with each of the plurality of instruction threads.

26. The apparatus of claim 25, wherein the power unit includes a chipset unit and a controller unit.

27. The apparatus of claim 26, wherein the activity level indication includes an identifier associated to the instruction thread represented.

28. The apparatus of claim 27, wherein the activity level indication represents that the associated instruction thread is in a stop grant mode.

29. The apparatus of claim 28, wherein the low power mode is a sleep mode.

30. The apparatus of claim 29, wherein each identifier includes an identification signal that represents the associated instruction thread.

31. The apparatus of claim 30, wherein the activity level indication is a first special bus cycle.

32. A system comprising:
- a processor including execution resources to support a plurality of logical processors, the plurality of logical processors to execute instructions for a plurality of instruction threads concurrently, responsive to a clock signal;
- a first unit to monitor a power indication for each of the logical processors; and
- a second unit to place the processor in a low power mode in response to the first unit detecting each of the power indications in a first state.

33. The system of claim 31, wherein the first unit includes a power control unit.

34. The system of claim 33, wherein the second unit includes a chipset unit and a processor controller unit.

35. The system of claim 34, wherein the power indication includes an identifier associated to the logical processor represented.

36. The system of claim 35, wherein a first state of each power indication represents whether the associated logical processor is in a stop grant mode.

37. The system of claim 36, wherein the low power mode is a sleep mode.

38. The system of claim 37, wherein each identifier includes an identification signal associated with the associated logical processor.

39. The system of claim 38, wherein the power indication is a first special bus cycle.

40. A processor comprising:
- a first processor to operate in a first power mode and a second power mode;
- a second processor to operate in the first power mode and the second power mode; and
- a bus interface to generate a low power signal to indicate a transition from the first power mode to the second power mode, the low power signal to further indicate which one of the first processor and the second processor transitioned from the first power mode to the second power mode.

41. The processor of claim 40, wherein said first processor and said second processor are logical processors.

42. The processor of claim 40, wherein the first power mode represents an activity level of a logical processor.

43. The processor of claim 40, wherein the first power mode is a first low power mode, and wherein the second power mode is a second low power mode.

44. The processor of claim 40, wherein the first power mode is a stop grant mode, and wherein the second power mode is a sleep mode.

45. The processor of claim 40, wherein the first logical processor represents a first process thread, and wherein the second logical processor represents a second process thread.

46. The processor of claim 40, wherein the first power mode is a first thread sleep mode.

* * * * *

UNITED STATES PATENT AND TRADEMARK OFFICE
CERTIFICATE OF CORRECTION

PATENT NO. : 6,775,786 B1  Page 1 of 1
APPLICATION NO. : 09/951908
DATED : August 10, 2004
INVENTOR(S) : Bret L. Toll et al.

It is certified that error appears in the above-identified patent and that said Letters Patent is hereby corrected as shown below:

Col. 1, line 5 insert the following:
This application is a Continuation of prior application U.S. Serial No. 09/083,281, filed on May 22, 1998 and issued on October 23, 2001 as Patent Number 6,308,279 B1.

Signed and Sealed this

Eighth Day of May, 2007

JON W. DUDAS
*Director of the United States Patent and Trademark Office*